Patented July 25, 1933

1,919,742

UNITED STATES PATENT OFFICE

RICHARD PASTERNACK AND CLINTON P. AMMERMAN, OF BROOKLYN, NEW YORK, ASSIGNORS TO CHARLES PFIZER & COMPANY, OF BROOKLYN, NEW YORK, A CORPORATION OF NEW JERSEY

SOLUBLE BISMUTHYL MANNONATE AND THE PROCESS OF MAKING IT

No Drawing. Application filed April 22, 1931. Serial No. 532,114.

This invention relates to soluble bismuthyl mannonate and the process of making it, and more particularly to sodium and potassium bismuthyl mannonate.

The known bismuthyl compounds of aldonic acids are relatively insoluble in water and, therefore, are unsuitable for therapeutic purposes.

The highly soluble bismuthyl compounds which are known, are compounds of harmful acid radicals, such as tartrates.

Bismuthyl mannonic acid, as previously prepared, is only slightly soluble.

We have now discovered that pure, highly soluble alkali-metal bismuthyl mannonate can be obtained from mannonic acid, and a solution of this product lends itself very readily to subcutaneous injection.

The process for the preparation of these new soluble bismuthyl compounds is illustrated by the following examples:

Example I 35.5 g. of d-mannonic lactone are dissolved in 200 cc. of water and neutralized with 10.6 g. sodium carbonate. The solution is boiled for some time to effect complete conversion to sodium mannonate. After cooling this solution, 109 g. bismuth nitrate

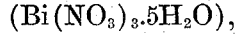

partially hydrolyzed with 100 cc. of water to form bismuth subnitrate are stirred in and followed with the addition of a cooled solution of 51 g. sodium hydroxide in 150 cc. of water. The mixture is then agitated until complete solution of the bismuth takes place. The sodium bismuthyl mannonate thus formed is now precipitated by pouring the reaction mixture into two volumes of 95% alcohol. The precipitate is filtered and washed with alcohol. It is then redissolved in this condition in the least quantity of water, the solution neutralized with acetic acid until only faintly alkaline to phenolphthalein to remove any sodium hydroxide, and reprecipitated in two volumes of alcohol. The precipitate of pure sodium bismuthyl mannonate is filtered off, washed with alcohol, and dried at about 40° C.

Example II

Pure potassium bismuthyl mannonate may be prepared by substituting, for the sodium compounds specified in Example I, chemically equivalent quantities of the corresponding potassium compounds.

Sodium and potassium bismuthyl mannonate obtained in this manner are white, amorphous powders, free of nitrate and caustic alkali, and soluble in less than two parts of water. The product contains 44–50% of bismuth.

The bismuth content of sodium or potassium bismuthyl mannonate can be varied within a wide range without changing the physical characteristics of the product. By increasing the bismuth nitrate and sodium hydroxide or potassium hydroxide proportionately in the above examples salts with as high as 60% bismuth can be obtained. Salts of any desired lower bismuth content can be made by decreasing the quantities of bismuth nitrate and sodium hydroxide or potassium hydroxide in proportion.

With one part of water, sodium or potassium bismuthyl mannonate forms a clear, jelly-like mass, which is of uniform consistency and contains no solid particles. With three to four parts of water, they readily become mobile, and exhibit the ordinary characteristics of a limpid solution.

While we have designated bismuth nitrate as one of the reacting compounds our invention is not to be so limited, as bismuth subnitrate or other normal or basic inorganic bismuth salt from which bismuth hydroxide is formed by treatment with a soluble alkali-metal hydroxide or ammonium hydroxide may be used.

The invention claimed is:

1. Highly soluble alkali-metal bismuthyl mannonate.

2. Highly soluble alkali-metal bismuthyl mannonate having variable bismuth content.

3. Pure highly soluble, alkali-metal bismuthyl mannonate.

4. Highly soluble alkali-metal bismuthyl mannonate capable of forming a clear jelly-like mass with water.

5. Highly soluble alkali-metal bismuthyl mannonate capable of forming a clear jelly-like mass with one part of water.

6. Highly soluble alkali-metal bismuthyl mannonate capable of forming a limpid solution.

7. Highly soluble alkali-metal bismuthyl mannonate capable of forming a limpid solution with three to four parts of water.

8. Process for the preparation of highly soluble alkali-metal bismuthyl mannonate which comprises treating a solution of alkali-metal mannonate with an alkali-metal hydroxide and an inorganic bismuth salt from which bismuth hydroxide is formed by treatment with alkali-metal hydroxide.

9. Process for the preparation of highly soluble alkali-metal bismuthyl mannonate which comprises treating a solution of alkali-metal mannonate with an inorganic bismuth salt from which bismuth hydroxide is formed by treatment with an alkali-metal hydroxide, and precipitating with alcohol the alkali-metal bismuthyl mannonate formed.

10. Process for the preparation of highly soluble alkali-metal bismuthyl mannonate which comprises treating a solution of alkali-metal mannonate with bismuth subnitrate and an alkali-metal hydroxide to form alkali-metal bismuthyl mannonate.

11. Process for the preparation of highly soluble alkali-metal bismuthyl mannonate which comprises treating a solution of alkali-metal mannonate with bismuth subnitrate and an alkali-metal hydroxide, precipitating with alcohol the alkali-metal bismuthyl mannonate formed, dissolving the alkali-metal bismuthyl mannonate in water and neutralizing with an acid, and reprecipitating with alcohol the alkali-metal bismuthyl mannonate.

12. Process for the preparation of highly soluble alkali-metal bismuthyl mannonate which comprises treating a solution of alkali-metal mannonate with the corresponding quantity of bismuth subnitrate and the corresponding quantity of an alkali-metal hydroxide.

RICHARD PASTERNACK.
CLINTON P. AMMERMAN.